United States Patent Office 2,984,978
Patented May 23, 1961

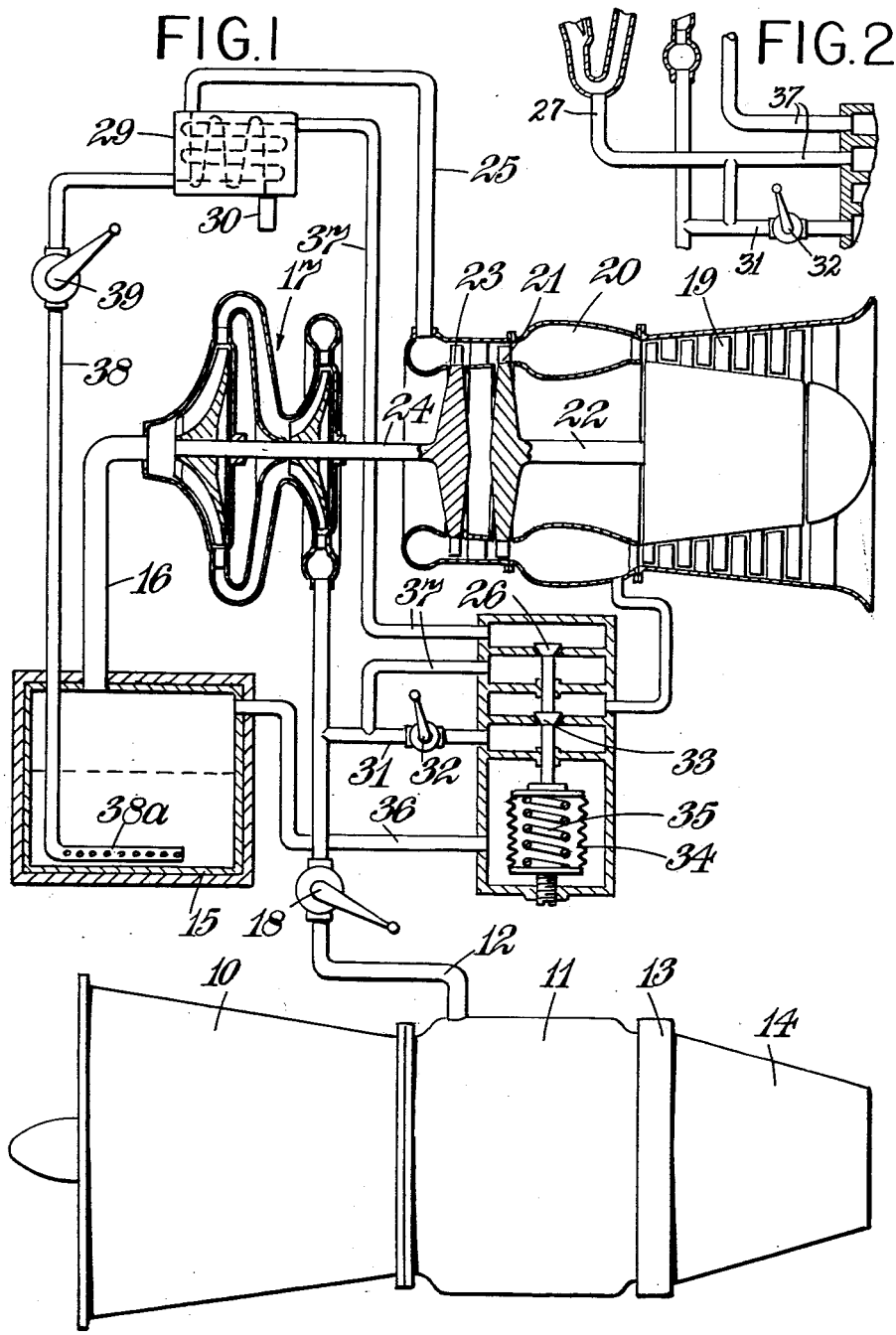

2,984,978

FUEL SYSTEM FOR SUPPLYING GASEOUS FUEL TO INTERNAL COMBUSTION ENGINES

Alan Arnold Griffith, Derby, England, assignor to Rolls-Royce Limited, Derby, England, a British company Filed Oct. 28, 1957, Ser. No. 692,739

Claim priority, application Great Britain Nov. 8, 1956

7 Claims. (Cl. 60—39.46)

This invention comprises improvements in or relating to fuel systems for internal combustion engines of the kind utilizing a fuel which is gaseous at normal temperature and pressure.

According to the present invention, a fuel system comprises a storage vessel for the fuel in liquefied form, from which vessel the fuel is drawn off in gaseous form, compressor means to which the gaseous fuel is delivered to be compressed prior to delivery to the engine, and means to control the flow of gaseous fuel to the engine.

According to a feature of this invention, means may be provided to heat the liquefied fuel in the storage vessel to assist in evaporation of the fuel. In one arrangement exhaust gas from an engine which is supplied with fuel by the fuel system, is passed in heat exchange with a part of the compressed gaseous fuel, the heated part of the gaseous fuel being delivered into the liquefied fuel in the storage vessel to heat it.

According to a preferred feature of this invention, the fuel system feeds compressed gaseous fuel to a main engine and to an auxiliary engine provided to drive the compressor means. In arrangements embodying this feature of the invention, the heating of the liquefied fuel may be effected as just set forth by the exhaust gas flow from the auxiliary engine.

According to another preferred feature of this invention, the control means is adapted to maintain a constant pressure within the storage vessel. For instance in one arrangement of fuel system supplying a main engine and an auxiliary compressor-driving engine and in which part of the gaseous fuel is heated by heat exchange with the exhaust gas from the auxiliary engine and fed back into the storage vessel to vaporise the liquefied fuel, the control means may comprise a main valve adjustable to control the flow of gaseous fuel to the main engine and a pressure-responsive valve connected to respond to the pressure within the storage vessel and arranged to control the supply of fuel to the auxiliary engine in the sense to increase the supply on decrease of pressure within the storage vessel and to decrease the supply on increase of pressure within the storage vessel, and preferably also to control the supply of heated gaseous fuel to the storage vessel in the sense of increasing and decreasing the supply of heated gaseous fuel on decrease and increase respectively of the pressure in the storage vessel from a selected valve. In such an arrangement the pressure within the storage vessel is preferably maintained to an absolute value which is less than atmospheric pressure at ground level, say 12 lbs. per square inch absolute; thus at ground level air will tend to enter the storage vessel through any leaks which will be sealed by freezing of the air.

The fuel system of this invention is especially applicable for supplying gaseous hydrogen to gas-turbine engines and in such application there may be provided a main storage vessel from which the gaseous fuel is drawn off for delivery to the engine or engines. Also in such application the compressor means preferably comprises a multi-stage centrifugal compressor. Furthermore, in such an application the compressed gaseous fuel may be employed for cooling purposes prior to its delivery into the engine or engines, for instance where the engines are used for propulsion of a high-speed aircraft, the compressed gaseous fuel may be employed for cooling parts of the aircraft.

In the drawings in which the same parts are denoted by the same reference numerals throughout the several views, Figure 1 is a diagrammatic drawing of a fuel system constructed in accordance with the present invention and illustrated as applied to a combustion engine, and Figure 2 is a fragmentary view of an alternate arrangement.

The gas turbine engine to be supplied with fuel comprises a compressor 10, combustion equipment 11 receiving air compressed in the compressor 10 and having gaseous hydrogen delivered into it through a supply pipe 12 for combustion with the air, a turbine 13 which receives products of combustion and a propelling nozzle 14 through which exhaust gas is passed to atmosphere in the form of a propulsive jet.

The fuel system comprises a heat-insulated storage vessel 15 containing the liquid hydrogen, the storage vessel having connected to it at its upper end a suction pipe 16 leading to the inlet of a multi-stage centrifugal compressor system 17 whereof the delivery is connected to the gaseous hydrogen supply pipe 12 leading to the combustion equipment 11 of the gas-turbine engine. The supply pipe 12 has connected in it a control valve 18 by means of which the supply of gaseous hydrogen to the engine is controlled.

The compressor system 17 is driven by an auxiliary engine comprising a compressor 19 which delivers compressed air to combustion equipment 20 which also has delivered into it gaseous hydrogen to be burnt with the air, a compressor-driving turbine 21 which is operated by the products of combustion from the combustion equipment 20 and drives the compressor 19 by a shaft 22 and a low-pressure turbine 23 which is connected by a shaft 24 to the compressor system 17 to drive it. The exhaust from the turbines 21, 23 is delivered into an exhaust pipe 25 leading to a heat exchanger 29, the heat exchanger having an exhaust gas outlet 30 to atmosphere.

The heat exchanger 29 is employed to heat part of the compressed gaseous hydrogen delivered by the compressor system 17 prior to its being returned to the storage vessel to heat the liquid hydrogen. For this purpose a conduit 37 leads from the main gaseous hydrogen supply pipe 12 to the heat exchanger 29 and a conduit 38 leads from the heat exchanger 29 into the storage vessel 15, the outlet end 38a of the conduit 38 being close to the bottom of the storage vessel 15 and being perforated. The conduit 38 has in it a shut-off cock 39. In an alternative arrangement the conduit 37 may be connected to the delivery of the first stage of the centrifugal compressor as shown by conduit 27 in Figure 2 of the drawing.

The supply of gaseous hydrogen to the combustion equipment 20 of the auxiliary engine is tapped-off through a branch conduit 31 from the main supply pipe 12. The branch conduit 31 contains a shut-off cock 32 and a control valve 33 for controlling the supply of gaseous hydrogen to the combustion equipment 20. The valve 33 is actuated by an evacuated capsule 34 loaded internally by a spring 35; the exterior of the capsule is loaded through a conduit 36 by the pressure within the storage vessel 15. It is arranged that when the absolute pressure in the storage vessel 15 increases to a value defined by the load of the spring 35 the valve 33 is closed down and that when the pressure in the storage vessel 15 decreases the valve 33 is opened up.

A further valve 26 actuated by the capsule 34 is provided in the conduit 37 so as to cut down the supply of heated compressed hydrogen to the storage vessel 15 when the pressure within the vessel tends to increase beyond a value defined by the load of spring 35. A relief valve (not shown) may also be provided in the storage vessel.

In operation, the main control of the power plant is effected by means of the control valve 18 and the pressure within the storage vessel 15 is maintained constant by means of the valve 33. It will be clear that when the pressure within the storage vessel 15 increases the valves 33 and 26 will be closed down so reducing the supply of fuel to the combustion equipment 20 of the auxiliary engine, and also reducing the delivery of heated hydrogen into the storage vessel 15 for evaporating the liquid hydrogen.

The compressed gaseous hydrogen flowing in the supply pipe 12 may be employed for cooling purposes, for instance for cooling parts of the aircraft in which the engine is fitted.

When an aircraft fitted with the above-described arrangement is stationary on the ground, the auxiliary engine may be kept running to burn any gaseous hydrogen evaporating naturally from the liquid hydrogen in the storage vessel 15 and in this case the valve 39 would be closed.

The loading afforded by spring 35 preferably defines an absolute pressure, for example 12 lbs. per square inch, which is less than ground level atmospheric pressure. Thus when the aircraft is stationary on the ground the storage vessel 15 will be subjected externally to a higher pressure than that within the vessel so that any leakage will be of air towards the interior of the vessel; any air tending to leak into the vessel in this manner will freeze thereby sealing any leakage passage which may exist.

I claim:

1. A power plant comprising a main combustion product driven engine, a liquid hydrogen storage vessel, a multistage compressor, a first conduit leading from the upper end of the storage vessel to the compressor, a main delivery conduit leading from the compressor to the engine, a control valve in said main delivery conduit, an auxiliary internal combustion engine driving the compressor, branch conduit leading from said main delivery conduit to the auxiliary engine, a first valve controlling the flow in the branch conduit, a heat exchanger having one flow path thereof connected to receive exhaust gases from the auxiliary engine, a further conduit connected between the compressor and the heat exchanger to convey part of the compressed gaseous hydrogen to a second flow path of the heat exchanger to be heated therein by the exhaust gases, a return conduit leading from said second flow path into the storage vessel adjacent the bottom thereof, a second valve controlling the flow in said further conduit, and a biased pressure-responsive device responsive to the pressure within the storage vessel and connected to operate the first and second valves to open them when the pressure falls below a selected value and to close them when the pressure rises above said value.

2. A power plant according to claim 1, comprising also a shut-off cock in said return conduit.

3. A power plant according to claim 1 wherein the main and auxiliary engines are gas turbine engines.

4. A power plant comprising a main combustion product driven engine, a liquid hydrogen storage vessel, a multi-stage compressor, a first conduit leading from the upper end of the storage vessel to the compressor whereby gaseous hydrogen is conveyed to the compressor to be compressed therein and thereby to be heated, a main delivery conduit leading from the compressor to the engine, a control valve in said main delivery conduit, an auxiliary internal combustion engine connected to drive the compressor, a branch conduit leading from said main delivery conduit to the auxiliary engine to convey compressed gaseous hydrogen to the auxiliary engine, a first valve controlling the flow of gaseous hydrogen in said branch conduit, a return conduit leading from the delivery of the compressor into the storage vessel adjacent the bottom thereof whereby part of the gaseous compressed and heated hydrogen leaving the compressor is returned to the storage vessel to evaporate liquid hydrogen, a second valve controlling the flow of gaseous hydrogen from said compressor into said return conduit, and a biased pressure-responsive device responsive to the pressure within the storage vessel and connected to operate said first and second valves to open them when the pressure within the storage vessel falls below a selected value and to close them when the pressure within the storage vessel rises above said value.

5. A power plant according to claim 4, comprising also a shut-off cock in said return conduit.

6. In combination, a main combustion engine, an auxiliary combustion engine and a hydrogen fuel system connected to supply gaseous hydrogen to the engines, said fuel system comprising a storage vessel for the hydrogen in liquefied form, from which vessel the fuel is drawn off in gaseous form, compressor means to which the gaseous hydrogen is delivered to be compressed and thereby to be heated prior to delivery to the engine, said compressor means being driven by said auxiliary combustion engine, and means receiving a proportion of the heated compressed gaseous hydrogen and delivering said proportion of the heated compressed gaseous hydrogen into the storage vessel to cause evaporation of liquid hydrogen, said means returning the proportion of hydrogen to the storage vessel including a conduit leading from the outlet of the compressor means into the storage vessel and a heat exchanger connected in the conduit, in which heat exchanger exhaust gas from said auxiliary combustion is passed in heat exchange with said proportion of the compressed gaseous hydrogen, the gaseous hydrogen so heated being delivered into the liquefied fuel in the storage vessel to heat it, and said control means comprising a main valve adjustable to control the flow of gaseous hydrogen to the main engine and a pressure-responsive valve connected to respond to the pressure within the storage vessel and arranged to control the supply of gaseous hydrogen to the auxiliary engine in the sense to increase the supply on decrease of pressure within the storage vessel and to decrease the supply on increase of pressure within the storage vessel.

7. A fuel system according to claim 6, wherein the control means also comprises a pressure-responsive valve responsive to the pressure in the storage vessel and operated on increase and decrease of the pressure from a selected value to decrease and increase respectively the quantity of heated gaseous hydrogen fed to the storage vessel.

References Cited in the file of this patent

UNITED STATES PATENTS

| | | |
|---|---|---|
| 1,459,482 | Underwood | June 19, 1923 |
| 2,374,239 | Sedille | Apr. 24, 1945 |
| 2,576,985 | Wildhack | Dec. 4, 1951 |
| 2,602,289 | Anxionnaz et al. | July 8, 1952 |
| 2,651,911 | Sterland | Sept. 15, 1953 |